April 30, 1968
T. G. GRANRYD
3,380,547
STEERING SYSTEM
Filed Dec. 23, 1964
4 Sheets-Sheet 1
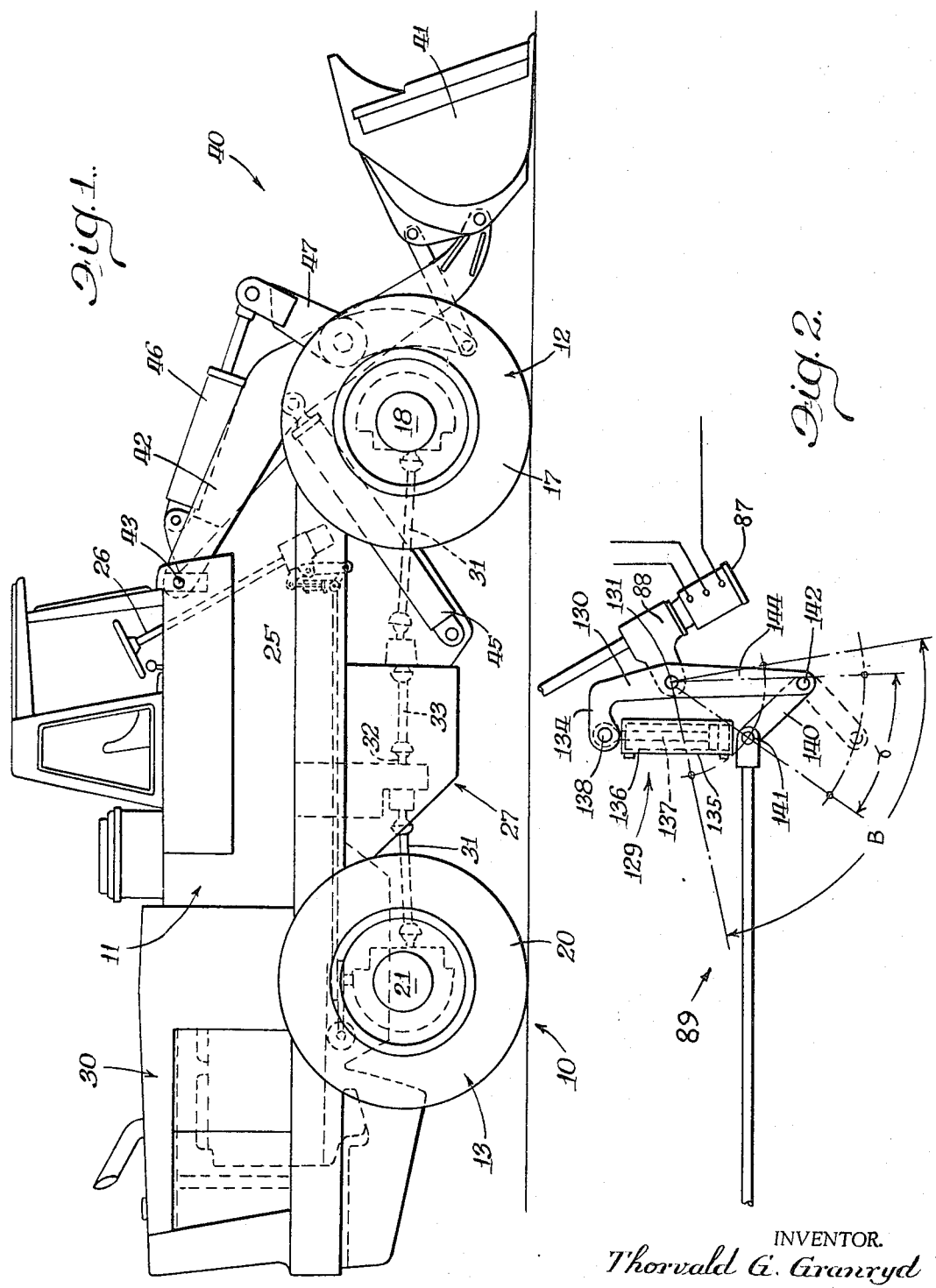
INVENTOR.
Thorvald G. Granryd
BY
Atty.

April 30, 1968

T. G. GRANRYD 3,380,547

STEERING SYSTEM

Filed Dec. 23, 1964

INVENTOR.
Thorvald G. Granryd
BY

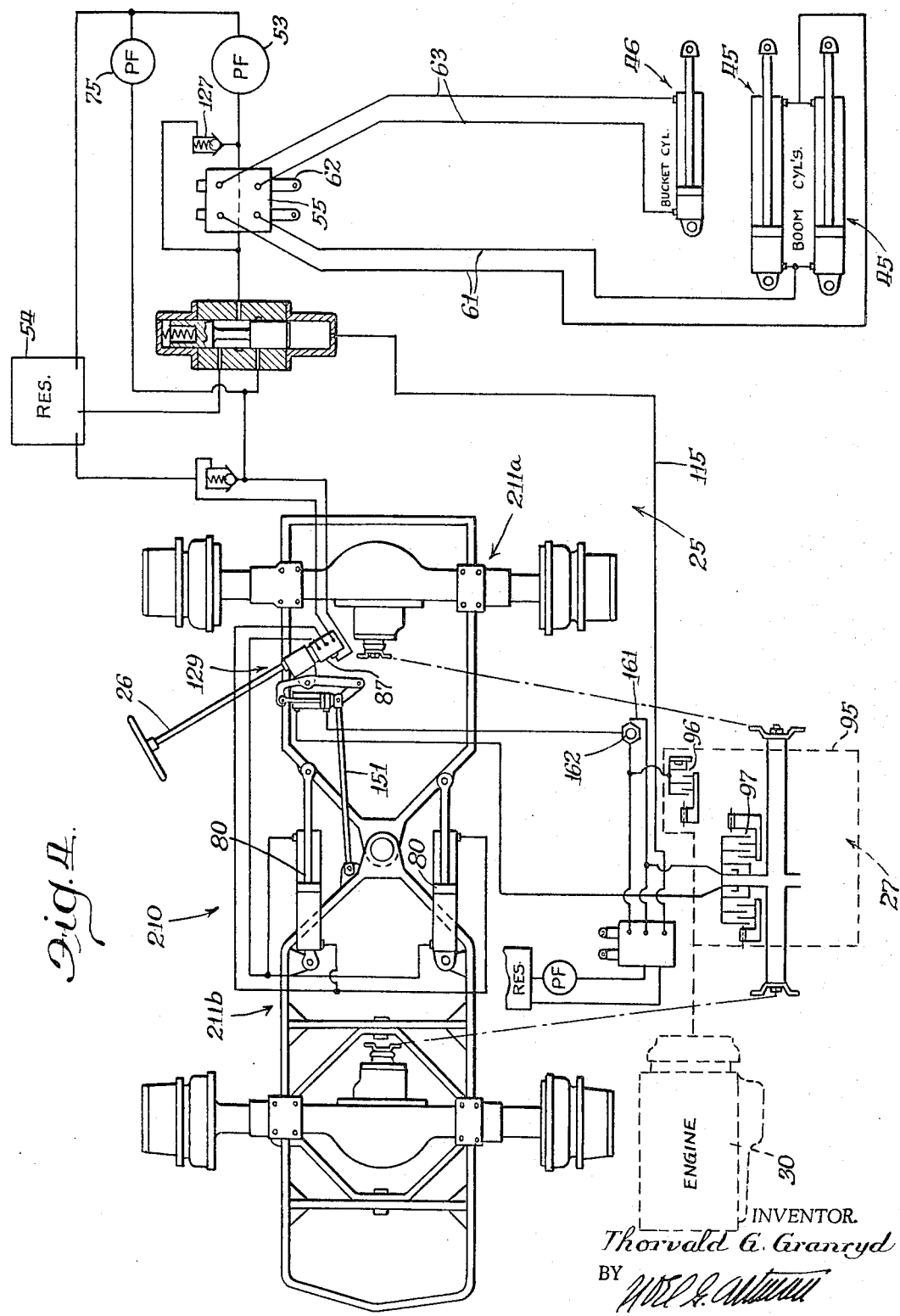

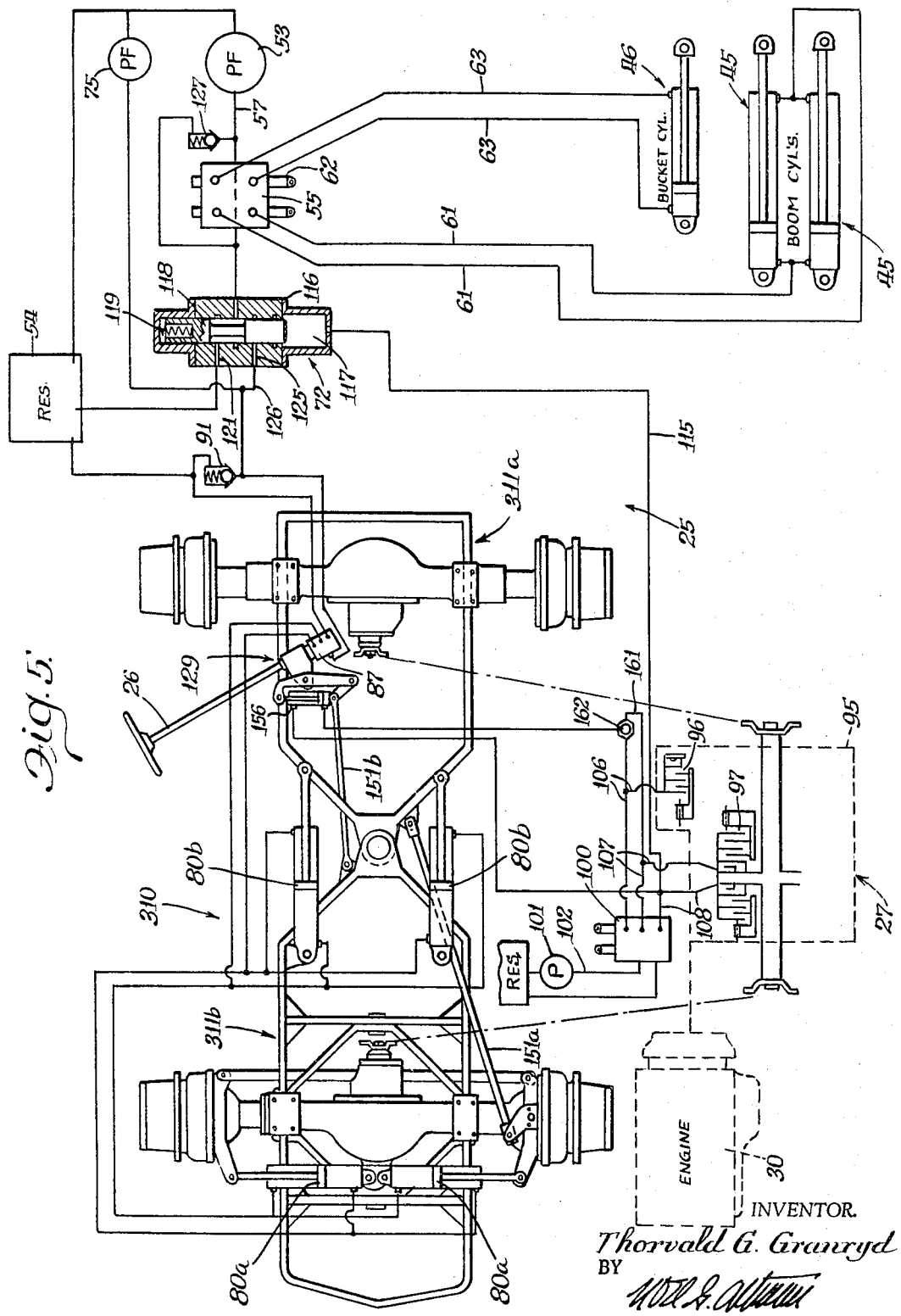

United States Patent Office 3,380,547
Patented Apr. 30, 1968

3,380,547
STEERING SYSTEM
Thorvald G. Granryd, Libertyville, Ill., assignor to International Harvester Company, a corporation of Delaware
Filed Dec. 23, 1964, Ser. No. 420,682
14 Claims. (Cl. 180—79.2)

This invention relates in general to vehicle steering systems. It deals more particularly with a steering system for a material handling vehicle or the like.

It is an object of this invention to provide a steering system which assures optimum vehicle performance in both short cycle operations such as material loading and stock piling, as well as in longer cycle operations including road travel and the like.

It is another object to provide improved maneuverability for material handling vehicles such as front end loaders employed primarily in short cycle operations which require continuous, short radius turning.

It is still another object to provide a steering system which requires normal effort on the part of the operator to effect a predetermined degree of turning during road travel of a vehicle, and automatically requires substantially less effort on the part of the operator to effect the same degree of turning while the vehicle is performing slow speed, short cycle operations.

It is yet another object to provide a steering system which affords faster steering action while the material handling vehicle is operating in its working ranges whereby translatory movement of the vehicle during short cycle turning is minimized, while still maintaining conventional steering characteristics while operating in travel ranges.

The foregoing and other objects are realized in accord with the present invention by providing a dual performance steering system productive of variable ratio steering and variable speed turning response to steering control. These variations in steering ratio and turning response speed are a function of the speed range settings of the vehicle whereby a normal, relatively high steering ratio and low response speed are effective in what might be referred to as the "travel" speed range of the vehicle, while a lower steering ratio and higher response speed are effective in what is generally considered the "working" speed range of the vehicle.

The invention, both as to its organization and method of operation, taken with further objects and advantages thereof, will best be understood by reference to the following description, taken in conjunction with the accompanying drawings, in which:

FIGURE 1 is a diagrammatic side elevational view of a front end loader incorporating a steering system embodying features of the present invention;

FIGURE 2 is a greatly enlarged side elevational view of a component unit in the steering assembly;

FIGURE 4 is a schematic view of the steering system as incorporated in an articulated frame loader; and FIGURE 5 is a schematic view of the steering system incorporated in a combination frame steer-wheel steer, articulated loader.

Figure 3:
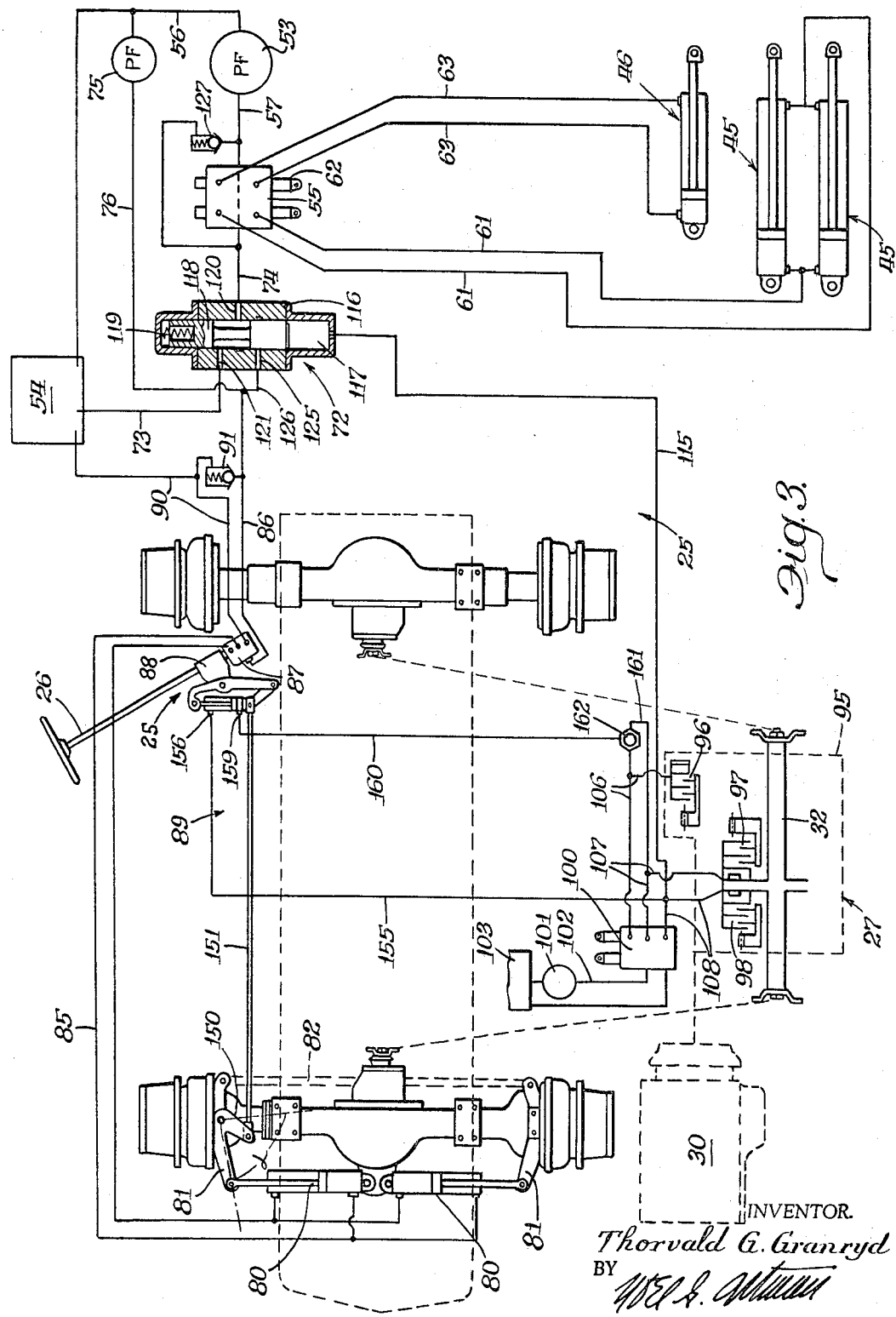
FIGURE 3 is a schematic view of the steering system in the fixed frame loader illustrated in FIGURE 1.

Referring now to the drawings, and particularly to FIGURE 1, a fixed frame front end loader is illustrated generally at 10. The loader 10, which is shown substantially diagrammatically, includes a frame 11 mounted on a front wheel assembly 12 and a rear wheel assemby 13.

The front wheel assembly 12 includes non-steerable front wheels 17 mounted for rotation on a front axle 18. The rear wheel assembly 13, on the other hand, includes rear wheels 20 steerably mounted on the rear axle 21. A steering system 25 embodying features of the present invention effects "dual ratio" and "dual response" steering at the rear wheels 20.

The steering system 25 provides dual ratio turning of the rear wheels 20, relative to rotation of the steering wheel 26 by the operator (not shown), and dual speed of response of the wheels 20 to operator control, both as a function of the speed range in which the vehicle 10 is travelling, the speed range being conventionally established through the transmission unit 27 in a well-known manner. In first and second gear operation of the vehicle 10, normally considered its working ranges, the ratio of the rotation of the steering wheel 26 to the turning of the wheels 20 automatically becomes approximately one-half the normal ratio of steering wheel 26 rotation required for the same amount of wheel 20 turning when the vehicle is in third gear, or road travel range. At the same time, the turning speed of the wheels 20 in response to rotation of the steering wheel 26 by the operator, when the vehicle 10 is operating in its working ranges, automatically becomes approximately twice the normal turning speed, or speed of response, afforded while the vehicle is in its travel range. The steering system 25 thus provides low ratio and fast response steering in the short cycle operations of the vehicle 10 where it is highly desirable and normal high ratio, slow response turning while the vehicle 10 is travelling on the highway.

The transmission unit 27 controls the speed range of the vehicle 10 as it is driven by an internal combustion power plant mounted on the rear of the frame 11. The power plant 30 drives all four wheels of the vehicle 10 through a drive shaft train 31, 32, 33, associated with the transmission unit 27 in a well-known manner. In this regard, it should be understood that although the power plant 30 is illustrated at the rear of the vehicle 10, it might suitably be mounted elsewhere on the frame 11. Furthermore the drive shaft train 31–33, shown in FIGURE 1, is intended to be merely partially illustrative of a typical drive train.

A broadly conventional front end loader unit 40 is provided at the front of the vehicle 10. The bucket 41 of the loader unit 40 is pivotally mounted between booms 42 which are, in turn, pivotally mounted at 43 on the frame 11. Fluid motors 45 control the raising and lowering of the booms 42, while a fluid motor 46 manipulates a conventional lever arrangement 47 to control the angularity of the bucket 41.

Referring to FIGURE 3, the boom motors 45 and the bucket motor 46 receive hydraulic fluid under pressure from a loader pump 53 suitably driven through a conventional power-take-off (not shown) from the power plant 30. The pump 53 draws hydraulic fluid from the hydraulic reservoir 54 and directs it to the boom motors 45 and to the bucket motor 46 through a conventional loader control valve 55 manipulated by the operator. A fluid conduit 56 connects the reservoir 54 and the pump 53, while a fluid conduit 57 connects the pump 53 with the valve 55. Manipulation of the valve spool 60 in the valve 55 by the operator in a well-known manner directs fluid through the appropriate conduit 61 to the desired sides of the fluid motors 45, while manipulation of the valve spool 62 in the same manner directs hydraulic fluid to the desired side of the bucket motor 46 through the appropriate fluid conduit 63.

Fluid under pressure which is exhausted from one side or the other of the fluid motors 45 and 46 is normally returned to the reservoir 54. According to the present invention, however, when the vehicle 10 is operating in first or second gear settings of the transmission unit 27, i.e., the working range of the vehicle, a diverter valve assembly 72 in the fluid return conduit 73, 74, automatically diverts return fluid from the motor control valve 55 into the steering system 25.

The rate of flow of fluid under pressure to the steering system 25 normally provided by a steering pump 75 is approximately doubled by introduction of the output of the loader pump 53. Accordingly, the rate of turning of the wheels 20 in response to rotation of the steering wheel 26 by the operator is increased by approximately two-fold over the normal turning rate of the wheels while operating in its third gear setting. The faster the wheels 20 of the vehicle 10 assume a prescribed turning angle, of course, the less translatory movement which occurs during actual steering. The result is lesser total distance traveled for each cycle of a truck loading operation, for example. On the other hand, because the greater speed of response may be hazardous during travel of the vehicle 10 from one job site to another, the speed of response is reduced by one-half to a normal response speed by withdrawing the loader pump 53 from service in the steering system 25 when the vehicle 10 is operating in third gear of travel range.

The normal steering pump 75 is arranged in parallel with the loader pump 53 in the fluid conduit 76. The fluid conduit 76 by-passes the diverter valve assembly 72 so that fluid under pressure from the steering pump 75 is always effective in the steering system 25. The steering pump 75 thus provides normal steering power for the steering system 25.

The actual turning of the wheels 20 is effected by two fluid motors 80 which operate control arms 81 interconnected by a conventional tie-rod 82 in a well-known manner. Fluid is directed to one side or the other of the motors 80 through an appropriate one of the identical fluid conduits 85 from a source conduit 86. A conventional rotary hydraulic valve 87, preferably of the type disclosed in Patent No. 2,762,231, directs the flow of fluid under pressure to one or the other of the conduits 85 from the source conduit 86. The source conduit 86 is connected directly to the fluid conduit 76 hereinbefore referred to in relation to the steering pump 75.

The rotary hydraulic valve 87 is well-known in the art and will not be described in detail. Suffice it to say that rotation of the steering wheel 26 to the left or right of a predetermined neutral position in which no fluid flows into conduits 85, causes fluid under pressure from the source conduit 86 to be directed to one or the other of the fluid conduits 85.

When the wheels 20 have turned a predetermined amount, a conventional gear assembly 88 is manipulated by a follow-up assembly 89 according to the present invention to neutralize the valve 87 and direct fluid under pressure back to the reservoir 54 through the fluid conduit 90. Details of the conventional gear assembly 88 are disclosed in Patents Nos. 2,762,231 and 3,048,234. Suffice it to say that assembly 88 comprises a section gear (not shown) pivoted by assembly 89 and which displaces a valving element (not shown) of the valve 87 to and from its neutral position. When the valving element is in the neutral position flow to the fluid motors 80 is terminated. Since the degree to which this flow is reduced is dependent upon the amount of valving element displacement, then neutralization of the valve is dependent upon the angle through which the assembly 89 pivots the section gear. Should pressure in the source conduit 86 become excessive at any time, a relief valve 91 vents the source conduit 86 to the reservoir 54.

The ratio of turning of the rear wheels 20 to rotation of the steering wheel 26 by the operator is determined by the amount of reaction of the follow-up assembly 89 to turning of the wheels 20 through a predetermined angle. With a maximum amount of reaction the assembly 89 pivots the section gear of gear assembly 88 through a large angle for such predetermined angle of wheel turning, and with a minimum amount of reaction the assembly 89 pivots the section gear through a small angle for the same angle of wheel turning. Thus, for a given rotation of steering wheel 26, a maximum follow-up reaction will move the valving element through a large displacement and therefore neutralize the valve sooner, while a minimum reaction will move the valving element through a smaller displacement with a correspondingly slower valve neutralization. When the vehicle 10 is operating in its normal travel range, or third gear, the amount of reaction of the follow-up assembly 89 is at a maximum and, consequently, the steering valve 87 is neutralized after the wheels 20 turn through a comparatively small angle relative to the amount of rotation of the steering wheel 26. Conversely, the amount of reaction of the follow-up assembly 89 to turning of the wheels 20 is approximately halved when the vehicle 10 is operating in its lower gears of working range. Consequently a proportionally greater turning angle of the wheels is established for a predetermined amount of rotation of the steering wheel 26.

As a result, fewer steering wheel 26 revolutions are required while the vehicle 10 is engaged in truck loading, to achieve a predetermined steering angle. However, while traveling from one job site to another at greater speeds and in travel range of the vehicle 10, it requires approximately twice as many steering revolutions to achieve the same steering angle. Obviously, this provides greater safety in road travel.

As has been pointed out, the "rate" of steering response of the wheels 20, as well as the steering ratio, are automatically controlled by the transmission unit 27. The transmission unit 27 includes a conventional three speed transmission, illustrative diagrammatically at 95, which may be of the planetary type with grounded clutches. It is understood that any other type of variable speed transmission means may also be utilized with this invention. As also illustrated diagrammatically, the transmission 95 incorporates a first or low gear 96, a second or intermediate gear 97, and a third or high gear 98. The transmission unit 27 controls the transmission of torque from the power plant to the four drive wheels 17 and 20 in a well-known manner.

The gears 96–98 of the transmission 95 are hydraulically actuated by the operator through the medium of a transmission control valve 100 which regulates the flow of fluid under pressure from a transmission pump 101. The pump 101 drives fluid through the supply conduit 102 from a conventional fluid reservoir 103 and directs it, under the influence of the control valve 100, to the appropriate transmission clutches (shown diagrammatically) of either the first gear 96 through the conduit 106, the second gear 97 through the conduit 107, or the third gear 98 through the conduit 108. The transmission control valve 100 and the transmission clutches are preferably of the type illustrated in applicant's Patent No. 2,961,889, entitled, "Tractor Loaders," assigned to the same assignee as the present invention.

According to the present invention, the fluid conduit 108, which carries control fluid under pressure to the transmission clutches to cause meshing of the third gear 98 of the transmission 95, has a branch fluid conduit 115 connected to it and to the valve body 116 of the diverter valve assembly 72. As illustrated, the fluid conduit 115 is in communication with the lower end of the valve bore 117 in the valve body 116 and is effective to force the valve core 118 upwardly in the bore 117 against the bias of the coil spring 119 when fluid under pressure is present in the conduit 115. The core 118 is thus biased upwardly against the coil spring 119 when the vehicle is placed in third gear 98, for road travel or the like.

With the valve core 118 of the valve assembly 72 in its uppermost position, as illustrated in FIGURE 3, return fluid from the loader pump 53 is directed back to the reservoir 54 through the conduit 74, the ports 120 and 121 in the valve body 116, and the conduit 74. The steering system 25 is thus receiving fluid under pressure through its source conduit 86 at a "normal" rate, i.e., solely from the steering pump 75.

On the other hand, if the vehicle transmission 27 is shifted into first or second gear, only exhaust fluid pressure is present in the fluid conduit 115 and the coil spring 119 drives the valve core 118 downwardly. With the valve core 118 in its lowermost position in the valve body 116, fluid under pressure from the loader pump 53 passes through the valve body 116 from the port 120 to the port 125 and from there into the source line 86 of the steering system 25 through the conduit 126. The rate of flow of fluid under pressure in the source line 86 is immediately approximately doubled and faster steering response is thus available for short cycle working operations in first and second gears. A pressure relief valve 127 associated with the loader control valve 55 prevents excessive back pressure build-up at the pump 53.

Referring now specifically to control of "steering ratio" by the steering system 25 embodying features of the present invention, attention is directed particularly to FIGURE 2. Here it will be seen that the follow-up assembly 89 is broadly conventional in construction and comprises a Pitman arm unit 129 including an inverted L-shaped lever 130 connected at 131 with the section gear (not shown) of the conventional gear assembly 88. When the lever 130 is pivoted about its axis at 131 it is effective in the manner set forth in Patent No. 2,762,231 to influence the valve setting of the hydraulic rotary valve 87. This influence amounts to a neutralization of the valve 87 when the wheels 20 have turned through a predetermined angle determined by the setting of the follow-up assembly 89 according to the present invention.

Depending from the head 134 of the lever 130 is a fluid motor 135 comprising a cylinder 136 and a piston-rod 137. A pivotal connection 138 is defined between the upper end of the piston-rod 137 and the head 134 of the lever 130. The lower end of the cylinder 136 is, in turn, pivotally connected to one end of a link 140 at 141, and the opposite end of the link 140 is pivotally connected at 142 to the body 144 of the lever 130. It will thus be seen that the effective moment arm length of the Pitman arm unit 129 about its axis 131 can be increased or decreased by merely extending or retracting the cylinder 136 on the piston rod 137.

According to the present invention, the effective length of the moment arm of the Pitman unit 129 precisely controls the steering ratio of the vehicle 10 within prescribed limits. To this end, the one end 141 of the link 140 is connected to a lever 150 (see FIGURE 3) affixed to a control arm 81 of one wheel 20 by a follow-up rod 151. With the transmission unit 27 engaged in third gear or travel range, the cylinder 136 is retracted. Thus the effective moment arm of the Pitman arm 129 is relatively short, as illustrated. For a steering angle α of the wheel 20, the Pitman arm unit 129 is then adapted to pivot through the angle β. This angular relationship of steering angle α to Pitman arm unit 129 angle β produces a normal steering ratio for third gear travel.

When the transmission unit 27 is engaged in first or second gear, i.e., the working ranges, the cylinder 136 is approximately doubled. Thus, in the working range of the vehicle 10, a Pitman arm unit 129 pivot angle γ is all that is required for turning the wheels 20 through the total steering angle α. Since the angle γ is approximately half of the angle β, the number of steering wheel 26 revolutions required to obtain maximum steering angle is approximately halved. Therefore while traveling from one job site to another, the steering system 25 remains normal, but while the vehicle 10 is engaged in a working cycle, the required movement of the steering 26 is reduced approximately one-half.

Extension and retraction of the cylinder 136 on the fluid motor 135 is automatically controlled by the gear setting of the transmission unit 27. As such, the fluid conduit 108 providing fluid under pressure for shifting into third gear 98 has a branch conduit 155 connecting it to the upper end of the cylinder 136, as at 156. Accordingly, when the vehicle 10 is operating in third gear, or travel range, fluid pressure above the piston rod causes the cylinder 136 to be retracted and the link 140 to assume the solid line position illustrated in FIGURES 2 and 3. High ratio steering is thus provided in the travel or road gear.

When the vehicle 10 is shifted into either second gear 97 or first gear 96, the fluid pressure is directed to the lower end of the cylinder 136, as at 159, through the branch conduit 160. Consequently, the cylinder 136 is extended. As illustrated, the branch conduit 160 is connected to both fluid supply conduits 106 and 107 of the gears 96 and 97 by a common branch conduit 161 through a two-way check valve 162. Low ratio steering is thus provided in the working gears.

The steering system 25 embodying features of the present invention has hereinbefore been discussed solely in the context of a wheel steered, fixed frame vehicle 10. However, it should be recognized that the steering system 25 finds suitable application to frame steered, articulated vehicles, and also to combined wheel steer-frame steer, articulated vehicles.

Referring to FIGURE 4, the steering system 25 embodying features of the present invention is illustrated diagrammatically in association with a frame steered articulated vehicle 210. The system 25 is identical to the steering system hereinbefore described in relationship to the fixed frame vehicle 10 except that the steering fluid motors 80 interconnect the pivoted frame sections 211a and 211b rather than steering the rear wheels 20 directly. Furthermore, the follow-up rod 151 connects the rear vehicle section 211b to the Pitman unit 129. The motors 80 vary the angular relationship between the frame sections 211a and 211b to steer the vehicle 210, and the follow-up rod 151 effects a prescribed movement of the Pitman arm unit 129 to neutralize the steering valve 87 when the prescribed steering angle is established between the sections 211a and 211b.

Turning to FIGURE 5, the steering system 25 embodying features of the present invention is illustrated diagrammatically in association with a combination frame steer-wheel steer articulated vehicle 310. The steering system 25 utilized with the vehicle 310 is identical to the systems hereinbefore discussed with but two exceptions. First, two sets of steering fluid motors are employed; one set 80a to steer the wheels directly, and one set 80b to connect the frame sections 311a and 311b and vary the angular relationship therebetween. Second, a rear drag link 151a connects the wheel mounted lever arm 150 with the front frame section 311a to coordinate the two sets of steering, and a front follow-up rod 151b connects the rear frame section 311b with the Pitman arm unit 129.

Operation of the system 25 in the context of the frame steer-wheel steer, articulated vehicle 310 should be obvious in view of the foregoing discussions of the systems 25 as utilized on the vehicles 10 and 210. Suffice it to say that the rate of turning of both the wheels 20 relative to the rear frame section 311b, and the entire rear frame section 311b relative to the front frame section 311a, is approximately doubled by the steering system 25 when the vehicle is operating in its working ranges of first and second gear, for example, similarly, the normal steering ratio of both the rear wheels 20 relative to the rear frame section 311b, and the rear frame section 311b relative to the front frame section 311a, is approximately halved from the normal ratio when the vehicle 310 is shifted into first or second gear from its road travel third gear. The use of both a wheel steering and frame steering vehicle emphasizes the amount of steering which can be accomplished and, accordingly, emphasizes the difference between the dual ranges of the steering system 25.

Throughout the description of the steering system 25 embodying features of the present invention, the steering ratio has been discussed in terms of being approximately halved in shifting from normal or third gear travel range to first or second gear working range. Furthermore, the rate of turning response has been discussed solely in terms of being approximately doubled in going from normal third gear steering to first or second gear steering. It should be understood, however, that these figures might be varied considerably without departing from the present invention.

While several embodiments described herein are at present considered to be preferred, it is understood that various modifications and improvements may be made therein, and it is intended to cover in the appended claims all such modifications and improvements as fall within the true spirit and scope of the inventon.

What is claimed is:

1. In a multiple speed range vehicle, a steering system for providing a relatively high steering ratio and a relatively low turning rate during high speed range travel, and a relatively low steering ratio and relatively high turning rate during low speed range working, comprising: fluid motor means for turning the vehicle, steering pump means for supplying fluid under pressure to said fluid motor means, additional pump means for supplying additional fluid under pressure to said fluid motor means, control means which, upon being energized, directs the flow of fluid under pressure from both of said pump means to said motor means to effect vehicle turning, follow-up means operatively connected with said control means to terminate the flow of fluid responsive to a first vehicle turning angle for a predetermined amount of energization of said control means during high speed range travel, and to terminate the flow of fluid responsive to a second vehicle turning angle greater than said first angle for said predetermined amount of energization of said control means during low speed range working, and selector means which render said additional pump means ineffective to supply fluid under pressure to said motor means during high speed range travel whereby fluid under pressure is then directed to said motor means at a relatively low rate, said selector means rendering said additional pump means effective to supply fluid under pressure to said motor means during low speed range working whereby fluid under pressure is then directed to said motor means at a relatively high flow rate.

2. In a multiple speed range vehicle wherein a transmission setting determines the speed range in which the vehicle is operating, a steering system for providing a relatively high steering ratio and a relatively low turning rate during high speed range travel, and a relatively low steering ratio and relatively high turning rate during low speed working, comprising: fluid motor means for turning the vehicle, steering pump means for supplying fluid under pressure to said fluid motor means, additional pump means for supplying additional fluid under pressure to said fluid motor means, control means which, upon being energized, directs the flow of fluid under pressure from both of said pump means to said motor means to effect vehicle turning, follow-up means controlled by the transmission setting and operatively connected with said control means to terminate the flow of fluid responsive to a first vehicle turning angle for a predetermined amount of energization of said control means during a high speed range transmission setting, and to terminate the flow of fluid responsive to a second vehicle turning angle greater than said first angle for said predetermined amount of energization of said control means during a low speed range transmission setting, and selector means responsive to transmission setting which renders said additional pump means ineffective to supply fluid under pressure to said motor means during high speed range travel whereby fluid under pressure is then directed to said motor means at a relatively low flow rate, said selector means rendering said additional pump means effective to supply fluid under pressure to said motor means during low speed range working whereby fluid under pressure is then directed to said motor means at a relatively high flow rate.

3. In a multiple speed range vehicle wherein a hydraulically operated transmission establishes the speed range, a steering system for providing a relatively high steering ratio and a relatively low turning rate during high speed range travel, and a relatively low steering ratio and relatively high turning rate during low speed-range working, comprising: fluid motor means for turning the vehicle, steering pump means for supplying fluid under pressure to said fluid motor means, additional pump means for supplying additional fluid under pressure to said fluid motor means, control means which, upon being energized, directs the flow of fluid under pressure from both of said pump means to said motor means to effect vehicle turning, follow-up means controlled by the hydraulic system of the transmission and operatively connected with said control means to terminate the flow of fluid responsive to a first vehicle turning angle for a predetermined amount of energization of said control means during a high speed range setting of the hydraulic system, and to terminate the flow of fluid responsive to a second vehicle turning angle greater than said first angle for said predetermined amount of energization of said control means during a low speed range setting of the hydraulic system, and selector means connected to the hydraulic system of the transmission which renders said additional pump means ineffective to supply fluid under pressure to said motor means during high speed range travel whereby fluid under pressure is then directed to said motor means at a relatively low flow rate, said selector means rendering said additional pump means effective to supply fluid under pressure to said motor means during low speed range working whereby fluid under pressure is then directed to said motor means at a relatively high flow rate.

4. The steering system of claim 3 further characterized in that said selector means includes a diverter valve, said diverter valve being effective to direct the fluid output of said additional pump means to said control means when the transmission setting is for low speed range travel, and direct said output of said additional pump means back to a source thereof when the transmission setting is for high speed range travel.

5. The steering system of claim 3 further characterized in that said follow-up means includes pivot arm means effective to terminate the flow of fluid by pivoting through a predetermined angle for a certain angle of vehicle turning, fluid motor means mounted on said lever arm for varying the effective length thereof to vary the angular response of said pivot arm means to vehicle turning, said fluid motor means being connected to the hydraulic system of the transmission whereby it extends the effective length of said lever arm during low speed range working of the vehicle and retracts the effective length of said lever arm during high speed range travel.

6. In a multiple speed range material handling vehicle having fluid motor operated working means, a steering system for providing a relatively high steering ratio and a relatively low turning rate during high speed range travel, and a relatively low steering ratio and relatively high turning rate during low speed range working, comprising: fluid motor means for turning the vehicle, steering pump means for supplying fluid under pressure to said fluid motor means, working pump means for normally supplying fluid under pressure to the working means, control means which, upon being energized directs the flow of fluid under pressure from both of said pump means to said motor means to effect vehicle turning, follow-up means operatively connected with said control means to terminate the flow of fluid responsive to a first vehicle turning angle for a predetermined amount of energization of said control means during high speed range travel, and to terminate the flow of fluid responsive to a second vehicle turning angle greater than said first angle for said predetermined amount of energization of said control means during low speed range working, and selector means which renders said working pump means effective to supply additional fluid under pressure to said motor means during low speed range working whereby fluid under pressure is then directed to said motor means at a relatively high flow rate.

7. In a multiple speed range vehicle, a steering system for providing a relatively low turning rate during high speed range travel, and a relatively high turning rate during low speed rate working, comprising: fluid motor means for turning the vehicle, steering fluid pump means for supplying fluid under pressure to said fluid motor means, additional fluid pump means for supplying fluid under pressure to said fluid motor means, control means for directing the flow of fluid under pressure from both of said pump means to said motor means to effect vehicle turning, selector means responsive to the speed range setting of the vehicle to render said additional pump means ineffective to supply fluid under pressure to said motor means during high speed range travel whereby fluid under pressure is then directed to said motor means at a relatively low flow rate, and effective to supply additional fluid under pressure to said motor means during low speed range working whereby fluid under pressure is then directed to said motor means at a relatively high flow rate.

8. In a multiple speed range vehicle for material handling and the like wherein the vehicle includes frame sections articulated to each other to accommodate vehicle turning, a steering system for providing a relatively higher steering ratio and a relatively low turning rate during high speed range travel, and a relatively low steering ratio and relatively high turning rate during low speed range working, comprising: fluid motor means interconnecting the frame sections for effecting articulation therebetween, steering pump means for supplying fluid under pressure to said fluid motor means, additional pump means for supplying additional fluid under pressure to said motor means, control means which, upon being energized, directs the flow of fluid under pressure from both of said pump means to said motor means to effect vehicle turning, follow-up means operatively connected with said control means to terminate the flow of fluid responsive to a first vehicle turning angle for a predetermined amount of energization of said control means during high speed range travel, and to terminate the flow of fluid responsive to a second vehicle turning angle greater than said first angle for said predetermined amount of energization of said control means during low speed range working, and selector means which renders said additional pump means ineffective to supply fluid under pressure to said motor means during high speed range travel whereby fluid under pressure is then directed to said motor means at a relatively low flow rate, said selector means rendering said additional pump means effective to supply fluid under pressure to said motor means during low speed range working whereby fluid under pressure is then directed to said motor means at a relatively high flow rate.

9. In a multiple speed range vehicle for material handling and the like wherein the vehicle includes steerable wheels and frame sections which articulate relative to each other to assist in turning the vehicle, a steering system for providing a relatively high steering ratio and a relatively low turning rate during high speed range, and a relatively low steering ratio and relatively high turning rate during low speed range working, comprising: first fluid motor means interconnecting the steerable wheels with one of said frame sections for turning said wheels relative thereto, second fluid motor means interconnecting said frame sections for articulating said sections relative to each other, steering pump means for supplying fluid under pressure to each of said fluid motor means, additional pump means for supplying additional fluid under pressure to each of said fluid motor means, control means which, upon being energized, directs the flow of fluid under pressure from both of said pump means to said motor means to effect vehicle turning, follow-up means operatively connected with said control means to terminate the flow of fluid responsive to a first vehicle turning angle for a predetermined amount of energization of said control means during high speed range travel, and to terminate the flow of fluid responsive to a second vehicle turning angle greater than said first angle for said predetermined amount of energization of said control means during low speed range working, and selector means which render said additional pump means ineffective to supply fluid under pressure to said motor means during high speed range travel whereby fluid under pressure is then directed to said motor means at a relatively low flow rate, said selector means rendering said additional pump effective to supply fluid under pressure to said motor means during low speed range working whereby fluid under pressure is then directed to said motor means at a relatively high flow rate.

10. In a multiple speed range vehicle, a steering system for providing a relatively high steering ratio during high speed range travel, and a relatively low steering ratio during low speed range working, comprising: fluid motor means for turning the vehicle, fluid pump means for supplying fluid under pressure to said fluid motor means, control means for directing the flow of fluid under pressure from said pump means to said motor means to effect vehicle turning, and follow-up means operatively connected with said control means to terminate the flow of fluid responsive to a first vehicle turning angle when said control means is energized to a predetermined extent during high speed range travel, and to terminate the flow of fluid responsive to a second vehicle turning angle greater than said first angle when said control means is energized to said predetermined extent during low speed range travel.

11. The steering system of claim 10 further characterized in that said control means includes steering valve means, said follow-up means including lever means effective to terminate the flow of fluid after a predetermined steering angle is established for a predetermined energization of said steering valve, the effective length of said lever means being variable to vary the ratio of steering valve energization to resultant steering angle.

12. The steering system of claim 11 further characterized by and including means to selectively vary the effective length of said lever means to change the steering ratio of the steering system.

13. The steering system of claim 12 further characterized in that said means to vary the effective length of said lever means includes fluid motor means responsive to the speed range setting of the vehicle, said fluid motor means shortening the effective length of said lever means when the vehicle is in a relatively high speed travel range, and automatically lengthening the effective length of said lever means when the vehicle is shifted to a relatively low speed working range.

14. In a multiple speed range vehicle having articulated first and second frame sections with frame steering capacity and steerable wheels on said first frame section, a steering system for providing a relatively high steering ratio during high speed range travel, and a relatively low steering ratio during low speed range working, comprising: first fluid motor means for turning said steerable wheels, second fluid motor means interconnecting the frame sections for effecting articulation thereof, fluid pump means for supplying fluid under pressure to said fluid motor means, control means for directing the flow of fluid under pressure from said pump means to said motor means to effect vehicle turning, and follow-up means operatively connected with said control means to terminate the flow of fluid responsive to a first vehicle turning angle when said control means is energized to a predetermined extent during high speed range travel, and to terminate the flow of fluid responsive to a second vehicle turning angle greater than said first angle when said control means is energized to said predetermined extent during low speed range travel, said follow-up means including lever means effective to neutralize said control means after a predetermined steering angle is established for said predetermined energization of said control means, the effective length of said lever means being variable to vary the ratio of control means energization to resultant steering angle, said follow-up means further including follow-up rod means interconnecting the first frame section with said lever means.

References Cited

UNITED STATES PATENTS 2,614,644 10/1952 Gustafson ---------- 180—79.2
2,863,234 12/1958 Armington ---------- 180—79.2

BENJAMIN HERSH, *Primary Examiner.*

J. H. BRANNEN, L. D. MORRIS, *Assistant Examiners.*